Figure 1:
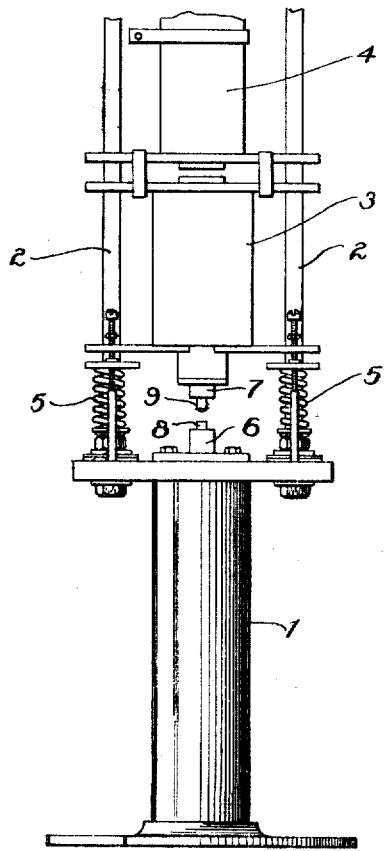

April 15, 1924.

C. T. ALLCUTT 1,490,191

WELDING APPARATUS

Filed June 25, 1921

WITNESSES:
L. F. Sonnemann.
W. B. Jaspert.

INVENTOR
Chester T. Allcutt.
BY
ATTORNEY

Patented Apr. 15, 1924.

1,490,191

UNITED STATES PATENT OFFICE.

CHESTER T. ALLCUTT, OF PITTSBURGH, PENNSYLVANIA, ASSIGNOR TO WESTINGHOUSE ELECTRIC & MANUFACTURING COMPANY, A CORPORATION OF PENNSYLVANIA.

WELDING APPARATUS.

Application filed June 25, 1921. Serial No. 480,365.

*To all whom it may concern:*

Be it known that I, CHESTER T. ALLCUTT, a citizen of the United States, and a resident of Pittsburgh, in the county of Allegheny and State of Pennsylvania, have invented a new and useful Improvement in Welding Apparatus, of which the following is a specification.

My invention relates to electro-percussive welding, more especially to a method of and means for holding or supporting members to be welded.

In a patent to Chubb, No. 1,066,468, granted July 8, 1915, and assigned to the Westinghouse Electric & Manufacturing Company, is described a method of and apparatus for joining metallic bodies by electro-percussive welding. The specific method therein described consists in joining members, such as wires, rods and the like, by fusing their adjacent surfaces and simultaneously forging the same together by means of percussive engagement. The apparatus includes a pair of gripping members or chucks for holding the members to be welded and a weight or hammer which is utilized as a percussive means for forging the members together.

It is often desirable to weld together two members, one or both of which are of irregular contour or shape. Chucks or gripping devices for holding irregularly shaped bodies are expensive and difficult to make unless a great number of pieces of a given shape are to be welded because gripping devices must be made to conform to the shape of the article to be gripped.

My invention provides means for holding irregularly shaped members to be electro-percussively welded, it being among the objects thereof to provide a simple, efficient and inexpensive holder or gripping device for expeditiously and effectively welding together bodies of irregular contours and shapes.

In practicing my invention, I provide an apparatus consisting of a base or support having a plurality of columns extending vertically therefrom in which is mounted a movable ram provided with a gripping device for holding one of the members to be welded. A similar gripping device is provided in the base. The gripping devices or the members to be welded are connected to a suitable welding circuit including means, such as a condenser or a transformer, for discharging a relatively large current in a short time.

The electrodes or members to be welded are placed in the gripping devices, at least one of which consists of a container having a viscous solid, such as asphaltum, gum, tar and the like therein. Although such viscous solids may be deformed by continuous pressure, yet they are extremely resistant to deformation from sudden shock and firmly support the members to be welded. An arc is established between the electrodes to fuse the surfaces thereof which are brought into percussive engagement to forge them together.

Figure 2:
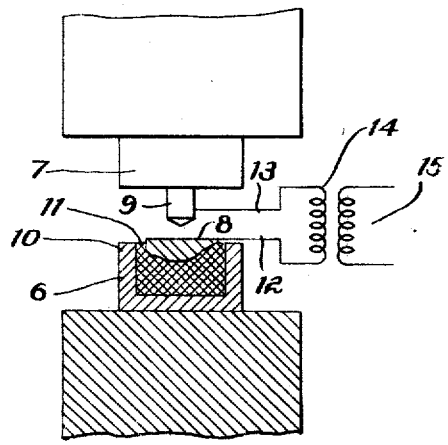

In the accompanying drawings, forming a part hereof and in which like reference characters designate like parts, Figure 1 is a front elevational view of an apparatus for forming welds in accordance with my invention, and Fig. 2 is an enlarged view of the gripping devices for holding the electrodes, showing the electrodes connected to a source of welding current.

The apparatus consists of a support or base 1 having a plurality of vertical columns 2 between which are mounted a pair of movable rams 3 and 4, the ram 3 being supported by a plurality of coil springs 5 to normally provide a predetermined space between it and the base 1. The gripping devices 6 and 7 are secured to the base 1 and the ram 3, respectively. The electrodes 8 and 9, at least one of which is of irregular shape, are inserted in the gripping devices 6 and 7, respectively.

The gripping device 6, as shown in Fig. 2, consists of a container 10 for holding a viscous solid 11 in which the irregularly shaped electrode 8 is supported. The viscous material 11 may consist of materials such as asphaltum, gums, tar and the like. The electrode 8 may be pressed into the viscous material 11 which will firmly support it during the welding operation. Or the material may be melted, the electrode placed in position therein and the material allowed to solidify. The electrode 9 may consist of an elongated metallic body such as wire having a wedge like end formed thereon and is secured in the gripping device 7 in the usual manner. Electrical connections 12 and 13 are made from the members 8 and 9, respectively, to the secondary winding 14 of a transformer 15. An arc may be formed in the usual manner, as described in the above cited patent, to fuse the adjacent surfaces of the electrodes which are forged together by bringing them into percussive engagement.

It will be readily seen from the above description of my invention that I have provided means for holding electrodes which is inexpensive and effective and may be utilized to firmly hold articles of irregular shapes or rough contour. A considerable advantage in using viscous solids for gripping the electrodes is that they insulate the electrodes from the apparatus and permit of less expensive construction.

Although I have described a specific embodiment of my invention, it will be obvious to those skilled in the art that various modifications may be made within the scope thereof without departing from the principles herein set forth. For instance, I may employ any suitable viscous material in place of the asphaltum, gum or tar and I may omit the containers therefor and secure the viscous materials directly to the stationary or movable supports in any suitable manner. Although I have described the welding of a wire electrode to an irregularly shaped electrode, it will be appreciated that both electrodes to be welded may be of irregular contour and each may be held in a viscous material during the welding operation.

I claim as my invention:—

1. In an electro-percussive welding system, means for holding members to be welded comprising plastic material.

2. In an electro-percussive welding system, means for holding members to be welded comprising a container having plastic material therein.

3. In an electro-percussive welding system, means for holding members to be welded comprising a container having viscous material therein.

4. In an electro-percussive welding system, means for holding members to be welded comprising a container having tar therein.

5. In an electro-percussive welding system, means for holding members to be welded comprising a container having asphaltum therein.

6. In an electro-percussive welding system, means for holding members to be welded comprising a container having a gum therein.

7. In a method of electro-percussive welding, the step which consists in providing a container, filling said container with a viscous solid and securing a member to be welded in said viscous solid.

In testimony whereof, I have hereunto subscribed my name this 17th day of June 1921.

CHESTER T. ALLCUTT.